July 14, 1970

S. PRUSSIN ET AL 3,520,449

AUTOMATIC SHUT-OFF VALVE FOR TWO FLUID SOURCES RESPONSIVE
TO DEPLETION OF ONE FLUID SOURCE

Filed Oct. 2, 1968

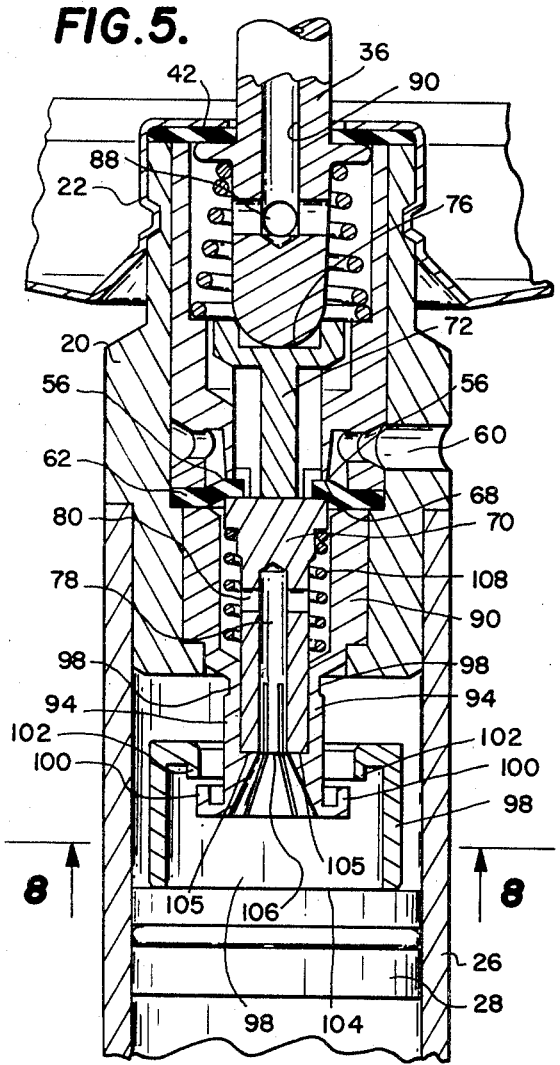
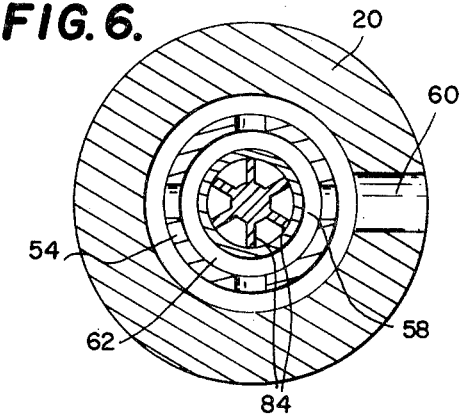
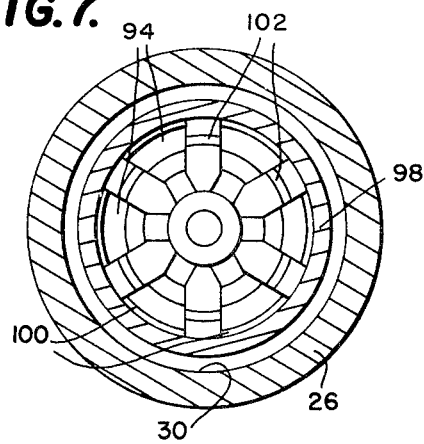
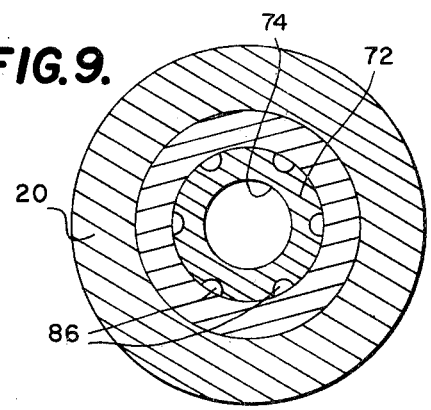
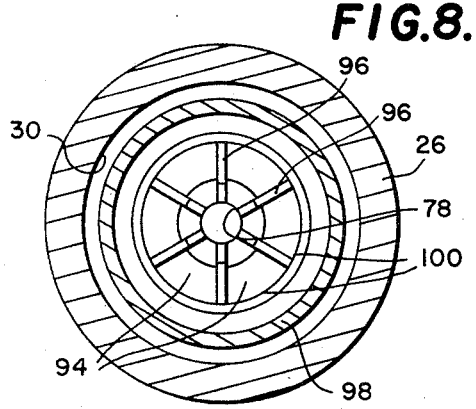

United States Patent Office 3,520,449
Patented July 14, 1970

3,520,449
AUTOMATIC SHUT-OFF VALVE FOR TWO-FLUID SOURCES RESPONSIVE TO DEPLETION OF ONE FLUID SOURCE
Samuel Prussin, Los Angeles, and Jimmie L. Mason, Hacienda Heights, Calif., assignors to Dart Industries Inc., Los Angeles, Calif., a corporation of Delaware
Filed Oct. 2, 1968, Ser. No. 764,552
Int. Cl. B67d 5/08
U.S. Cl. 222—66
6 Claims

ABSTRACT OF THE DISCLOSURE

An automatic shutoff valve for use with aerosol and non-aerosol products containers, wherein fluids from two separate sources of fluid, under pressure, may be dispensed in a mixture; the valve of the invention comprising automatic shutoff means in response to a depletion of flow and/or pressure from one source which causes the flow of fluid from another source in the container means to be shut off to thereby prevent dispensation of any fluid from the valve, when one of the fluid sources is depleted.

This invention relates to an automatic shutoff valve for use with various products, and more particularly, to an automatic shutoff valve for use with aerosol products, such as oxidation hair dyes, and shaving creams, or the like, so as to insure the mixture of a plurality of fluids in the valve before dispensation and to prevent the harmful dispensation of only one active fluid ingredient from the valve.

BACKGROUND OF THE INVENTION

In the pressurized dispensation of products, such as oxidation hair dye, it has been a problem to dispense a reliable mixture of dye and peroxide so as to prevent the harmful effects of dispensing either one of the active ingredients separately. Likewise, the dispensation of other products, such as some aerosol shaving creams which include soap and peroxide pose similar problems.

While there are valves for use in dispensing aerosol products, and particularly for use in dispensing a plurality of fluids from a common container means, control of the reactive fluids may not be efficiently accomplished by some of the prior art valves, and particularly in an automatic fashion and without attention of the operator. In many of the pressurized dispensers of the prior art, one source, of a plurality of fluid sources, may become exhausted prematurely or before exhaustion of one of the other sources of fluids, and thus cause an undesirable dispensing condition of the valve which may allow only a concentrated hydrogen peroxide to be dispensed, for example. In other situations, other active ingredients might be dispensed separately due to preliminary exhaustion of fluids which are normally utilized to mix with the active ingredients before being dispensed from the containers.

SUMMARY OF THE INVENTION

The foregoing problems, related to operation of prior art aerosol dispensing valves, are alleviated by operation of the present invention, wherein an automatic shutoff valve automatically prevents any one of several fluids from being dispensed separately, and particularly when it is desired to dispense a mixture of such active materials as dye and hydrogen peroxide in an oxidation hair dye. The present invention employs an automatic shutoff valve which is responsive to depletion of fluid from one source, or pressure of fluid from one source, in order to provide complete and automatic shutoff of a plurality of fluids which are normally dispensed in a mixture from the valve, thus preventing individual dispensation of any one of the active fluids.

The automatic shutoff valve of the invention communicates with inner and outer containers; the inner container being hollow and cylindrical and having a bore in which a piston is movably mounted. The piston is responsive to pressure fluid in the outer container to force fluid from the inner container through the valve means of the invention. The piston in the inner container is engageable with latch means carried by the valve housing which is adapted to lock the valve means of the invention in closed position, when material from the inner container is substantially depleted, and when the piston moves therein to a position in which it engages the latch means and locks the valve means of the invention, such that it cannot be manually opened.

Accordingly, it is an object of the present invention to provide a very simple and economical automatic shutoff valve for use with aerosol products containers from which a plurality of active fluids may be dispensed.

Another object of the invention is to provide a very simple automatic shutoff valve for aerosol containers comprising a dual dispensing valve structure having a resiliently powered latch means adapted to be operated by a piston in an inner container of the container means of the invention. The resiliently powered latch means having a plurality of resilient fingers and a movable holding member adapted to hold said fingers out of interference with a plunger of the valve means of the invention until the piston in the inner container of the invention engages the holder and releases it from the resilient fingers, whereby they react resiliently and move into interference with said plunger of the valve means and lock the valve means in closed position.

Another object of the invention is to provide a very simple mechanism, wherein the invention comprises an automatic shutoff valve having a plunger responsive to opening movement of the valve; the plunger having a plurality of resilient fingers adapted to be spread apart and into engagement with an annular ledge of the valve housing when a conical cam on a movable piston in the inner container of the invention engages between the fingers and forces them apart and outwardly into engagement with the annular ledge of the housing to thus lock the valve means of the invention in closed position; this being accomplished when the piston has moved in response to pressure fluid and a substantially exhausted supply of fluid in the inner container.

Further objects and advantages of the invention may be apparent from the following specification, appended claims, and accompanying drawings:

BRIEF DESCRIPTION OF THE DRAWINGS

FIG. 5 is a view similar to FIG. 3, but showing the valve means of the invention locked in closed position, and showing the latch holder out of engagement with the latching means and permitting it to assume a normal resiliently powered position in which it engages a plunger of the valve means and holds the valve means locked against manual operation;

FIG. 6 is a plan sectional view taken from the line 6—6 of FIG. 3;

FIG. 7 is a bottom plan sectional view taken from the line 7—7 of FIG. 3;

FIG. 8 is a sectional view taken from the line 8—8 of FIG. 5, showing the valve latch mechanism in locked position;

FIG. 9 is a fragmentary plan sectional view taken from the line 9—9 of FIG. 3;

DESCRIPTION OF THE PREFERRED EMBODIMENTS

Figure 1:
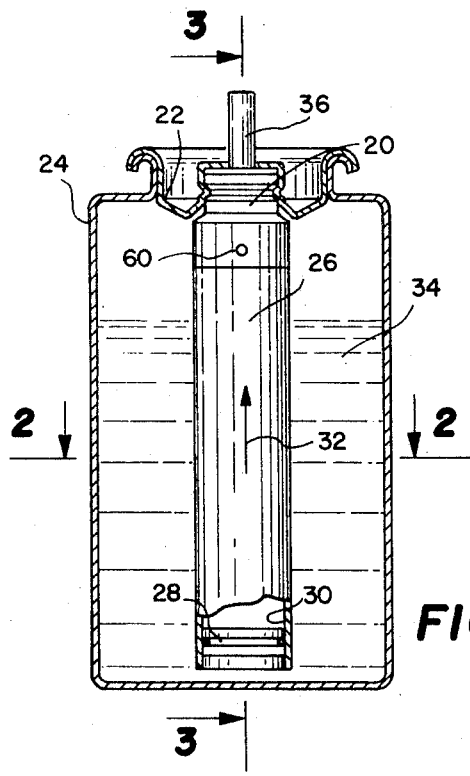
FIG. 1 is a side elevational view of an aerosol container showing portions thereof broken away and in section, and illustrating an automatic shutoff valve of the invention mounted in connection with the cap of the container, and further showing a chamber means communicating with and carried by the valve housing of the invention.
Figure 2:
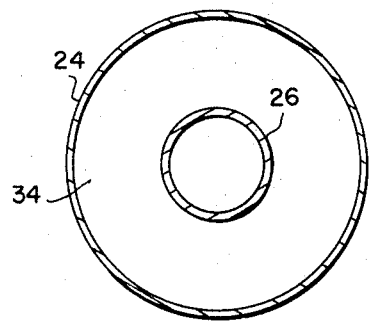
FIG. 2 is a plan sectional view taken from the line 2—2 of FIG. 1.
Figure 4:
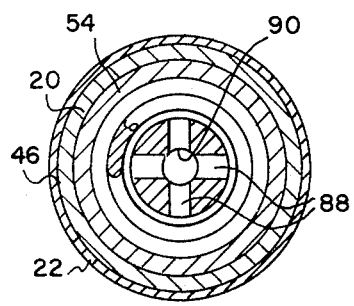
FIG. 4 is a fragmentary plan sectional view taken from the line 4—4 of FIG. 3.

As shown in FIG. 1 and in accordance with the present invention, an automatic shutoff valve 20 is carried by a container cap 22 secured in an open end of an aerosol container 24. This container 24 is generally termed an outer container, and the valve housing 20 supports an inner chamber 26 having a pressure responsive piston 28 movable in a bore 30 of the hollow cylindrical chamber 26, and adapted to be moved in a direction of an arrow 32 in response to pressure fluid 34 in the outer container 24. The inner chamber 26 contains fluid above the piston 28 to be forced through the valve means 20 as the piston 28 progressively moves in the direction of the arrow 32.

The valve housing 20 carries a movable dispensing nozzle 36 which is manually operable and adapted to dispense a mixture of fluids from the valve housing 20, the mixture containing fluids from the outer and inner chambers 24 and 26, respectively, all as will be hereinafter described in detail.

Figure 3:
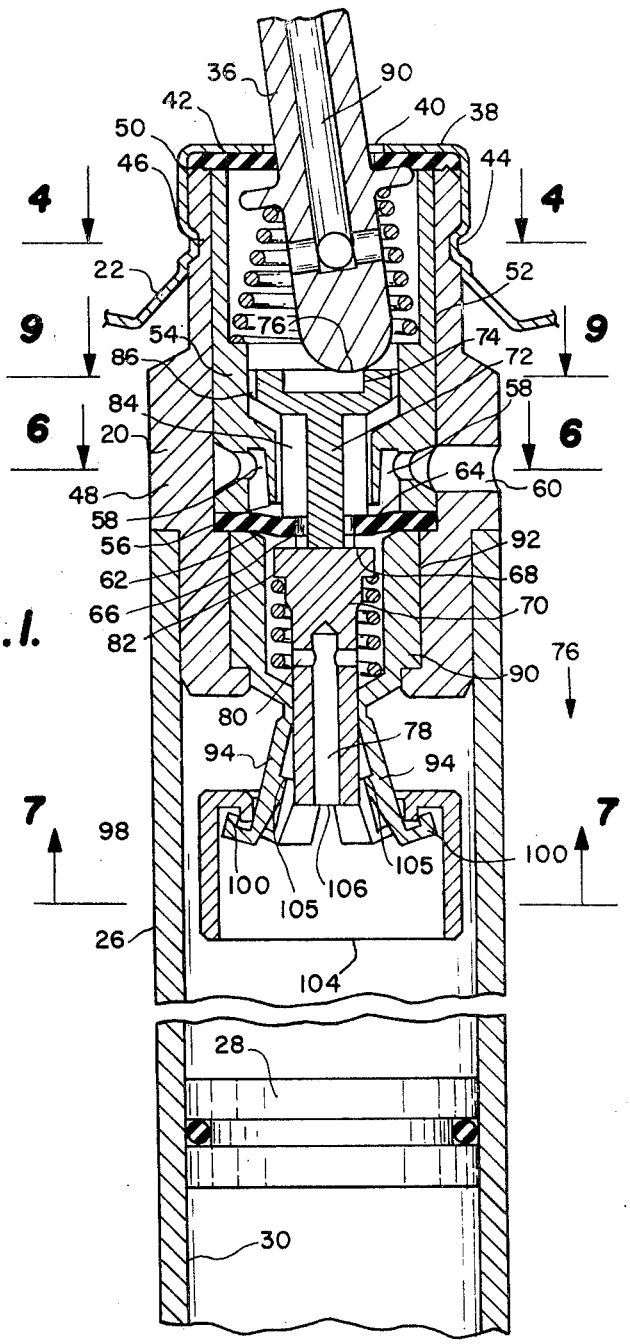
FIG. 3 is an enlarged fragmentary sectional view of the automatic shutoff valve means of the invention showing the valve in open position and showing the valve latch means maintained out of interference with the normal manual operation of the valve means of the invention.

As shown in FIG. 3 of the drawings, the container cap 22 is provided with a generally cup-shaped end portion 38 having a central opening 40 therein through which the nozzle 36 extends. A gasket 42 is held captive internally of the cup-shaped end 38 and forms a seal surrounding the nozzle 36 which is tiltably mounted therein.

A crimped portion 44 of the cap engages a groove portion 46 of a valve housing 48 of the invention to hold it securely engaged in the cap and supported thereby. The housing 48 is provided with an end portion 50 engaging the gasket 42 and holding it firmly disposed in the end portion of the cap 22.

The valve housing 48 is provided with a bore 52 containing a valve sleeve 54 which is provided with an annular valve seat 56 surrounded by an annulus 58 which communicates with a port 60 in the outer side of the valve housing 20, this port 60 communicates with pressure fluid internally of the outer chamber 24, all as will be hereinafter described in detail.

The annulus 58 communicates with one side of a flexible diaphragm-type valve element 62. This element 62 has one side 64 engageable with the annular seat 56 and is provided with an opposite side 66 engageable by a poppet valve element 68 of a valve plunger 70, which will be hereinafter described in detail.

The valve plunger 70 is actuated by a cam piston 72 having a generally cup-shaped cam portion 74 engageable by a spherical cam portion 76 of the nozzle 36. This cam portion 76, as shown in FIG. 3, is adapted to move the cam member 72 axially with relation to the bore 52 of the valve housing to force the plunger 70 in a direction of an arrow 76, such that the poppet 68 is moved away from the resilient valve element 62 which allows the flexible valve element 62 to move away from the seat 56 under fluid pressure in the annulus 58.

Likewise, fluid under pressure above the piston 28 communicates through an open bore 78 in the plunger 70 with ports 80 to allow fluid to pass through notches 82 at the periphery of the poppet portion 68 so that fluid may flow through the port 60 to the annulus 58 and concurrently fluid may flow through the bore 78, ports 80 and notches 82 to a position between fins 84 which are integral with and project radially from the cam plunger 72, shown best in FIG. 6 of the drawings. As the two fluids pass through the areas between the fins 84, they move around the cam plunger 72 and pass through notches 86 in the perimeter thereof, these notches being shown in FIG. 9 of the drawings. The two fluids then pass through ports 88 in the nozzle 36 and outwardly through a central bore 90 therein.

The supply of fluid 34 in the outer chamber 24 is normally greater than that in the inner chamber 26 so that fluid pressurized by the piston 28 normally is exhausted somewhat sooner than the pressurizing fluid 34.

The pressurizing fluid 34 may contain an active ingredient and also a pressurizing fluid.

The active ingredients or fluids in the outer chamber 24 and the inner chamber 26 may be harmful if dispensed individually, and therefore in accordance with the objects of the invention, the automatic shutoff valve of the invention contains structure adapted to lock the valve in closed position when fluid in the inner chamber 26 is exhausted or substantially depleted.

This locking mechanism, as shown in FIGS. 3, 5, 7 and 8 comprises an insert member 90 carried in a bore 92 of the housing 20. A lower end portion of the insert 90 is provided with a plurality of resilient fingers 94 which resiliently tend to assume the position shown in FIG. 5. These fingers are in an annular row and are separated by slots 96, as shown in FIG. 8. These fingers are also provided with reduced cross-section bending portions 98 adapted to promote resilient deflection thereof in an outward direction to a position shown in FIG. 3, wherein they are held out of normal position by a latch holding member 98. The fingers are provided with outwardly directed hook portions 100 which are engaged by an inwardly directed annular hook portion 102 of the annular holding member 98. This holding member 98 is provided with an end 104 engageable by the piston 28, such that when it moves to an extreme position in the bore 30 of the container 26, it forces the holding member 98 to a release position, as shown in FIG. 5, wherein the annular ledge or hook portion 102 is released from the hook portions 100 of the fingers 94 to allow them, in accordance with their resilient character and tendencies, to move inwardly to the normal position shown in FIG. 5, wherein the ledge portions 105, integral with the fingers 94, engage an end portion 106 of the plunger 70, to thereby lock the plunger 70 in a position, as shown in FIG. 5, wherein the poppet valve portion 68 thereof is firmly engaged with the resilient valve element 62 and thereby holding it in firm engagement with the annular valve seat 56, such that the valve is in closed position and locked against manual operation by means of the nozzle 36, as hereinbefore described.

It will be seen that a compression spring 108 in the insert 90 normally tends to move the plunger 70 into the position, shown in FIG. 5, and when in this position, the piston 28 may respond sufficiently to move the holding member 98 to the release position, as shown in FIG. 5 of the drawings. This function occurs when fluid is substantially depleted from the inner chamber 26, and after a valve operating cycle, where the valve means of the invention is allowed to move to closed position, and the spring 108 closes the plunger 70 and its poppet 68 against the resilient valve member 62, as hereinbefore described. At this time, release of the latch fingers 94 will cause the ledge portions 105 thereof to engage the end 106 of the plunger and prevent a subsequent axial movement thereof in response to actuation of the nozzle 36. Thus, the valve means of the invention is locked against opening movement by manual operation of the nozzle 36, and this insures that, after depletion of the active ingredients in the inner chamber 26, that no further active ingredients from the outer chamber may pass through the valve means of the invention via the port 60. It will be understood that the valve means, as disclosed, is normally operated in an inverted position, wherein fluid gravitates into direct communication with the port 60.

Figure 10:
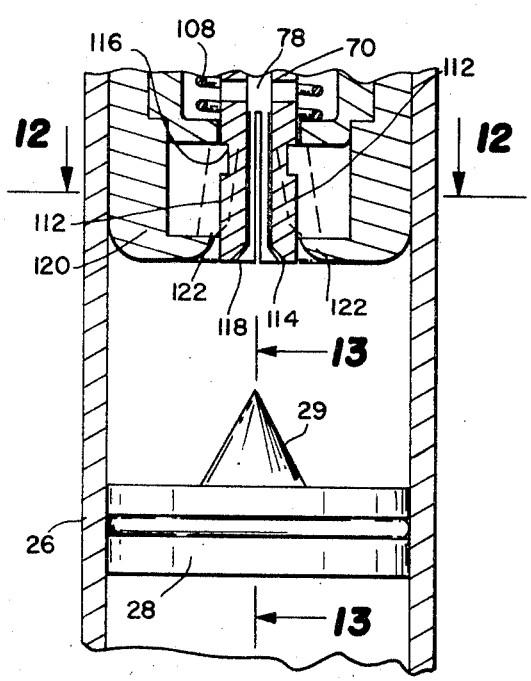
FIG. 10 is a view similar to FIG. 3, showing a modification of the valve latch mechanism of the invention.
Figure 12:
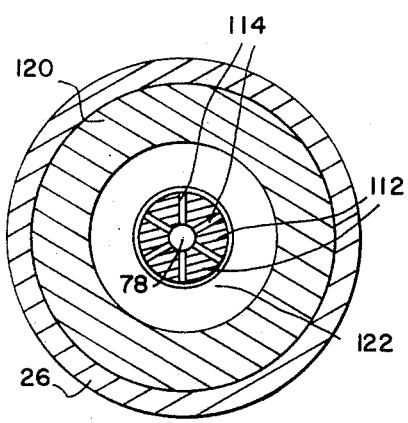
FIG. 12 is a plan sectional view taken from the line 12—12 of FIG. 10.
Figure 13:
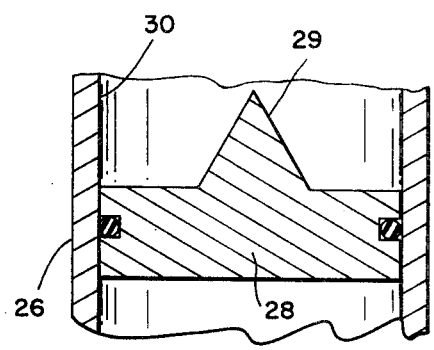
FIG. 13 is a fragmentary sectional view taken from the line 13—13 of FIG. 10.

In the modification, as shown in FIG. 10 of the drawings, the piston 28 is provided with a conical cam portion 29 and the plunger 70 is provided with a plurality of integral fingers 112 separated by slots 114, as shown in FIG. 12 of the drawings. These fingers are also provided with thin or reduced bending portions 116 to promote resilient deflection thereof, as will be hereinafter described.

Figure 11:
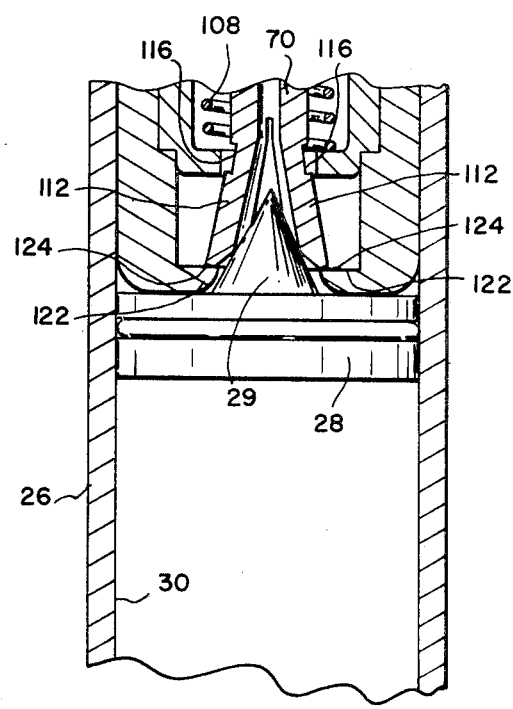
FIG. 11 is a view similar to FIG. 5, showing the same mechanism as shown in FIG. 10, but showing the valve latch mechanism of the invention in locked position and holding the valve means of the invention in closed position.

The ends of the fingers 112 are provided with tapered portions 118 forming a generally conical annular area to receive the conical cam 29, such that it may spread the fingers apart, as shown in FIG. 11, when the piston 28 moves to force the cam 29 between the fingers 112, all as shown in FIG. 11. This mode of operation occurring when the valve is in closed position, and when fluids are substantially depleted from the inner chamber 26. As shown in FIG. 10 of the drawings, the plunger 70 with its integral resilient deflectable fingers 112 is in open position and corresponds with the position of the valve, as shown in FIG. 3.

The housing, as shown in FIG. 10, is provided with a downwardly extending portion 120 having an inwardly directed annular ledge 122 adapted to be engaged by ends 124 of the fingers 112, when spread apart by the conical cam 29 at a time when the valve is in closed position. When this happens, the valve is locked since the plunger 70 cannot move axially away from the resilient valve element 62, as shown in FIG. 5 of the drawings.

It will be understood that the modification shown in FIGS. 10 to 13 of the drawings are related only to the plunger 70, and the plunger locking mechanism, and that the remainder of the valve mechanism and aerosol dispensing container structure are the same as that disclosed in FIGS. 1 to 9 of the drawings.

In the structure shown in FIGS. 10 and 11, the spring 108 functions in the same manner as that disclosed in FIGS. 3 and 5 for the purpose of moving the plunger 70 normally to the closed valve position.

It will be obvious to those skilled in the art that various modifications of the invention may be resorted to without departing from the spirit of the invention.

We claim:

1. A fluid pressure dispenser having an automatic shutoff valve comprising the combination of: a pressure container having inner and outer fluid chambers; a manually operable valve disposed to dispense fluids from both said chambers to an area externally relative to said container, said valve having a housing coupled to said inner chamber in the interior of said outer chamber; said inner chamber being cylindrical and having a bore; a piston movable in said bore and adapted to respond to fluid pressure in said outer chamber, said piston thus movable toward said valve housing to expel fluid from said inner chamber and through said valve; and resiliently powered latch tending to move to a normal position and to hold said manually operable valve in a closed position; a holder adapted to hold said latch means in position to allow said manually operable valve to be operated from a closed position to an open position; said piston, upon substantial depletion of fluid from said inner chamber, being movable into a position to engage and release said holder from said latch, such that said resiliently powered latch is permitted to move into said normal position and to hold said valve in closed position, such that it cannot be manually operated to said open position.

2. The invention, as defined in claim 1, wherein: said valve is provided with a poppet valve plunger axially slidably movable in said housing; said latch having a plurality of resilient fingers disposed in an annular row and having ledge normally adapted to engage said poppet plunger and to hold it in said normal position, wherein said valve means is closed; said resilient fingers having hook portions directed downwardly and outwardly; said holder being an annular member provided with an annular ledge engageable with said hook fingers to hold them outwardly away from said plunger so that said plunger may bypass said ledges; said holder, when engaged by said piston and forced axially relative to said inner chamber, adapted to move said annular portion away from said hook portions to permit the resilient structure of said fingers to move said ledge portions inwardly and engage said plunger to hold said valve means in closed position.

3. The invention, as defined in claim 2, wherein: said valve comprises a flexible annular valve element having opposite sides; one of said sides engageable with an annular poppet valve seat in said housing; a poppet valve carried by said plunger and engageable with the opposite side of said flexible valve element; and a passage communicating with each side of said flexible valve element and each of said passage communicating with separate sources of fluid in said chambers; one of said passages communicating with the interior of said inner chamber and another of said passages communicating with a source of pressure fluid externally relative to said inner chamber.

4. The invention, as defined in claim 1, wherein: said latch is carried by said valve housing; said valve housing having a movable valve plunger therein; said latch engageable with said plunger to normally prevent axial movement thereof; said holder having engaging said latch for holding it away from said plunger and adapted to be moved out of engagement with said latch by said piston.

5. A fluid pressure dispenser having an automatic shutoff valve comprising, the combination of: a pressure container having inner and outer fluid chambers; manually operable valve disposed to dispense fluids from both of said chambers to an area externally relative to said container; said valve having a housing coupled to said inner chamber in the interior of said outer chamber; said inner chamber being cylindrical and having a bore; a piston movable in said bore and adapted to respond to fluid pressure in said outer chamber, said piston thus movable toward said valve housing to expel fluid from said inner chamber and through said valve; said valve having a movable member in said housing responsive to manual opening movement of said valve; resilient latch operable to hold said movable member such as to prevent opening movement of said valve and to hold said movable member in substantially stationary position relative to said valve housing; said piston, upon substantial depletion of fluid from said inner chamber, movable into a position to operate said latch, such that said latch prevents movement of said movable member relative to said housing to thereby prevent manual operation of said valve to an open position.

6. The invention, as defined in claim 5, wherein: said piston is provided with a conical cam portion and said movable member is provided with a conical bore with resilient fingers surrounding said bore and adapted to be spread apart by said conical cam; said housing provided with an annular ledge surrounding said movable member and adapted to be engaged by said fingers when spread apart by said cam for holding said movable member in a position to maintain said valve means in closed position.

References Cited

UNITED STATES PATENTS

| | | | |
|---|---|---|---|
| 1,957,011 | 5/1934 | Fuller | 222—66 |
| 3,217,936 | 11/1965 | Abplanalp | 222—136 |

ROBERT B. REEVES, Primary Examiner

H. S. LANE, Assistant Examiner

U.S. Cl. X.R.

222—136